(12) United States Patent
Wei et al.

(10) Patent No.: US 11,290,931 B2
(45) Date of Patent: Mar. 29, 2022

(54) ELECTRONIC DEVICE, INFRASTRUCTURE EQUIPMENT AND METHODS

(71) Applicant: Sony Corporation, Tokyo (JP)

(72) Inventors: Yuxin Wei, Basingstoke (GB); Vivek Sharma, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,081

(22) PCT Filed: Dec. 6, 2018

(86) PCT No.: PCT/EP2018/083740
§ 371 (c)(1),
(2) Date: Jun. 5, 2020

(87) PCT Pub. No.: WO2019/110709
PCT Pub. Date: Jun. 13, 2019

(65) Prior Publication Data
US 2021/0195479 A1    Jun. 24, 2021

(30) Foreign Application Priority Data
Dec. 7, 2017   (EP) .................................... 17205827

(51) Int. Cl.
*H04W 4/00* (2018.01)
*H04W 36/00* (2009.01)
(Continued)

(52) U.S. Cl.
CPC ... *H04W 36/0077* (2013.01); *H04W 36/0061* (2013.01); *H04W 36/32* (2013.01); *H04W 76/27* (2018.02)

(58) Field of Classification Search
CPC ............. H04W 36/0077; H04W 76/27; H04W 36/0061; H04W 36/32; H04W 64/003; H04W 36/0055
(Continued)

(56) References Cited

U.S. PATENT DOCUMENTS 8,923,857 B2 * 12/2014 Kazmi .................. H04W 48/16
455/434
9,681,340 B2 * 6/2017 Sebire ............... H04W 36/0016
(Continued)

FOREIGN PATENT DOCUMENTS

EP   2403295 A1   1/2012
EP   3101941 A1   12/2016
(Continued)

OTHER PUBLICATIONS

International Search Report and Written Opinion dated Jan. 24, 2019 for PCT/EP2018/083740 filed on Dec. 6, 2018, 20 pages.
(Continued)

*Primary Examiner* — Amancio Gonzalez
(74) *Attorney, Agent, or Firm* — Xsensus LLP

(57) ABSTRACT

An infrastructure equipment comprising circuitry configured to receive assistance information with a handover request acknowledge message from a target base station, and to deliver the assistance information received from the target base station to an UE with dedicated signalling.

9 Claims, 11 Drawing Sheets

(51) Int. Cl.
*H04W 76/27* (2018.01)
*H04W 36/32* (2009.01)

(58) Field of Classification Search
USPC .......................................................... 370/331
See application file for complete search history.

(56) References Cited

U.S. PATENT DOCUMENTS

| | | | |
|---|---|---|---|
| 10,271,252 B2* | 4/2019 | Jung | H04W 36/00835 |
| 11,051,271 B2* | 6/2021 | Gunnarsson | G01S 1/20 |
| 2006/0068789 A1 | 3/2006 | Vannithamby et al. | |
| 2018/0324662 A1* | 11/2018 | Phuyal | H04B 7/15507 |
| 2020/0078909 A1* | 3/2020 | Park | B25B 23/103 |
| 2020/0205156 A1* | 6/2020 | Adjakple | H04W 74/0833 |
| 2020/0214073 A1* | 7/2020 | Shimoda | H04W 16/32 |
| 2020/0275319 A1* | 8/2020 | Murray | H04W 36/0005 |

FOREIGN PATENT DOCUMENTS

| | | |
|---|---|---|
| GB | 2498898 A | 7/2013 |
| WO | 2009/057732 A1 | 5/2009 |
| WO | 2018/059963 A1 | 4/2018 |

OTHER PUBLICATIONS

Ericsson, "Potential enhancements for HO", 3GPP TSG-RAN WG2 Meeting #98, R2-1705427, Hangzhou, China, May 15-19, 2017, 3 pages.
U-BLOX AG, "Discussion on State Space RTK Corrections", 3GPP TSG RAN WG2 Meeting #99, R2-1708646, Berlin, Germany, Aug. 21-25, 2017, 13 pages.
Huawei and Hisilicon, "Simulation Results of Mobility Issues for Drones", 3GPP TSG-RAN WG2 Meeting #99bis, R2-1710407, Prague, Czech Republic, Oct. 9-13, 2017, 8 pages.
Samsung, "Dedicated signalling of SI upon UE mobility", 3GPP TSG-RAN WG2 meeting #99 bis, R2-1711510, Same as R2-1709489, Prague, Czech Republic, Oct. 9-13, 2017, 2 pages.

* cited by examiner

```
HANDOVER_REQUEST
  ⌐ MIB/SIB1/SIB2 system information
  ⌐ AssistanceInfo
  ⌐ ...
```

Fig. 4a

```
AssistanceInfo
  ⌐ PositioningConfiguration
    ⌐ RKT_GNSS
  ⌐ PositioningConfigurationAssistanceInfo
    ⌐ RTKCorrectionDATA
      ⌐ Compact SSR Mask
      ⌐ Compact SSR GNSS Orbit Correction
      ⌐ Compact SSR GNSS Clock Correction
      ⌐ Compact SSR GNSS Satellite Code Bias
      ⌐ Compact SSR GNSS Satellite Phase Bias
      ⌐ Compact SSR GNSS Satellite Code and Phase Bias
      ⌐ Compact SSR GNSS URA
      ⌐ Compact SSR STEC Correction
      ⌐ Compact SSR STEC Correction
      ⌐ Compact SSR Gridded Correction
```

Fig. 4b

```
HANDOVER_REQUEST_ACKNOWLEDGE
  L ...
  L AssistanceInfo
  L ...
```

Fig. 6a

```
AssistanceInfo
  L PositioningConfiguration
    L RTK_GNSS
    L Barometric
  L PositioningConfigurationAssistanceInfo
  L TargetBaseStation
    L cellID
    L latitude
    L longitude
    L Height
  L BaseStation2
    L cellID
    L latitude
    L longitude
    L Height
  L BaseStation3
    L cellID
    L latitude
    L longitude
    L height
```

Fig. 6b

```
PositioningConfigurationAssistanceInfo
  L BarometricInfo
    L reference location info
      L ID number
      L longitude
      L latitude
      L coordination system
      L elevation
    L Measured values
      L temperature
      L barometer value
    L Validity info
      L Measured timestamp
      L expired time/date
      L next planned update time
      L validity area / cell radius
```

Fig. 6c

```
PositioningConfigurationAssistanceInfo
  L RTKCorrectionDATA
    L Compact SSR GNSS Clock Correction
```

Fig. 6d

ELECTRONIC DEVICE, INFRASTRUCTURE EQUIPMENT AND METHODS

CROSS-REFERENCE TO RELATED APPLICATIONS

The present application is based on PCT filing PCT/EP2018/083740, filed Dec. 6, 2018, which claims priority to EP 17205827.3, filed Dec. 7, 2017, the entire contents of each are incorporated herein by reference.

TECHNICAL FIELD

The present disclosure generally pertains to entities and user equipment of a mobile telecommunications system.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so called Long Term Evolution ("LTE"), which is a wireless communication technology allowing high-speed data communications for mobile phones and data terminals and which is already used for 4G mobile telecommunications systems.

Other candidates for meeting the 5G requirements are termed New Radio Access Technology Systems (NR). An NR can be based on LTE technology, just as LTE was based on previous generations of mobile communications technology.

LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommunications System"/"High Speed Packet Access") of the third generation "3G") network technologies.

LTE is standardized under the control of 3GPP ("3rd Generation Partnership Project"). There exists a successor LTE-A (LTE Advanced) allowing higher data rates as the basis LTE which is also standardized under the control of 3GPP.

For the future, 3GPP plans to further develop LTE-A, such that it will be able to fulfill the technical requirements of 5G. As the 5G system will be based on LTE or LTE-A, respectively, it is assumed that specific requirements of the 5G technologies will, basically, be dealt with by features and methods which are already defined in the LTE and LTE-A standard documentation.

Current technical areas of interest to those working in the field of wireless and mobile communications are known as the "Internet of Things", or IoT for short, and "Machine to Machine Communication" (M2M), or Machine Type Communication (MTC). The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network.

Unmanned Aerial Vehicles (UAV), more commonly referred to as "Drones", are aircrafts that operate with various degrees of autonomy, e.g. under remote control by a human operator or autonomously by onboard micro controller. The remote control of drones may be based on a usage of cellular networks in a regulatory manner. Consequently, a support of cellular communication could be foreseen for drones.

In 3GPP Tdoc R2-1710407, "Simulation Results of Mobility Issues for Drones", TSG-RAN WG2 Meeting #99bis, Prague, Czech Republic, 9-13 Oct. 2017, it is observed that a drone UE may suffer a much higher handover failure (HOF) rate than a territorial UE.

In 3GPP Tdoc R2-171151, "Dedicated signalling of SI upon UE mobility", TSG-RAN WG2 meeting #99bis, Prague, Czech Republic, 9-13 Oct. 2017, it is disclosed that in LTE, system information (SI) is transmitted in a source cell to a target during handover (HO) preparation. For simplicity the complete SIBs are provided (MIB, SIB1, SIB2). Within the handover command, the target provides a subset of the parameters included in MIB, SIB1, SIB2 i.e. the most essential ones (mainly RACH and physical configuration, see radioResourceConfigCommon within MobilityControlInfo). The UE acquires the full MIB/SIBs after HO completion (some operation requiring SFN may be temporarily be stalled until UE acquires MIB), upon which it stops using the values provided in the HO command. SI provision in NR is that MIB and SIB1 are always broadcast while SIB2 may be provided on demand. In the light of this, Tdoc R2-171151 proposes introducing for the case of handover (and possibly SCG cell addition) the option to transfer complete SIBs by means of the connection reconfiguration message, proposes introducing the option to include information regarding the SI used in the target cell in the HO command message, and proposes concluding the transfer of SI by dedicated signalling and the transfer of any assistance information to assist the network only after considering all relevant cases (including cases in which network initiated transfer of certain SI is deemed beneficial i.e. network push).

In view of this background, an efficient mobility management for aerial UEs is needed.

SUMMARY

According to a first aspect the disclosure provides an infrastructure equipment comprising circuitry configured to receive assistance information with a handover request acknowledge message from a target base station, and to deliver the assistance information received from the target base station to an UE with dedicated signalling.

According to a further aspect the disclosure provides an infrastructure equipment comprising circuitry configured to receive assistance information with a handover request message from a source base station.

According to a further aspect the disclosure provides an electronic device comprising circuitry configured to receive assistance information with a handover command from a source base station.

According to a further aspect the disclosure provides a method comprising transmitting assistance information with a handover request acknowledge message from a target base station to a source base station.

Further aspects are set forth in the dependent claims, the following description and the drawings.

BRIEF DESCRIPTION OF THE DRAWINGS

Embodiments are explained by way of example with respect to the accompanying drawings, in which:

FIG. 4a shows an embodiment of a handover request message;

FIG. 4b shows an embodiment of positioning information that may be included in a HANDOVER_REQUEST message;

FIG. 6a shows an embodiment of a handover request acknowledgement message as sent from sent from the target eNB to the source eNB;

FIG. 6b shows an embodiment of assistance information included in a handover request acknowledgement message;

FIG. 6c shows an example of positioning configuration assistance information that is sent from the target eNB to the source eNB;

FIG. 6d shows a further example of positioning configuration assistance information that is sent from the target eNB to the source eNB;

DETAILED DESCRIPTION OF EMBODIMENTS

Figure 1:
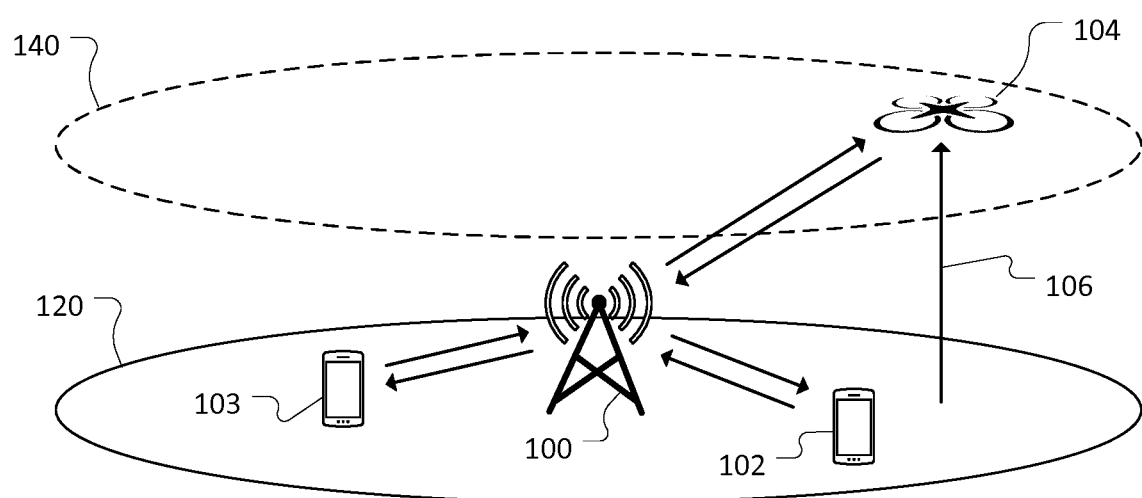
FIG. 1 shows an embodiment in which an eNB that is designed based on currently deployed base stations for cellular systems builds a different type of cell coverage ("areal cell coverage") for aerial UEs in addition to the normal cell coverage for terrestrial UEs.

The embodiments disclose an infrastructure equipment comprising circuitry configured to receive assistance information with a handover request acknowledge message from a target base station, and to deliver the assistance information received from the target base station to a UE with dedicated signalling.

The infrastructure equipment may also be referred to as a base station, network element such as an entity of a core network, an enhanced Node B (eNodeB, or eNB) or a coordinating entity for example, and may provide a wireless access interface to one or more communications devices within a coverage area or cell. The infrastructure equipment may for example be any entity of a telecommunications system, e.g. an entity of a New Radio Access Technology Systems.

A User Equipment (UE) may be any device that is related to an end-user or to a terminal to communicate in e.g. a Universal Mobile Telecommunications System (UMTS) and 3GPP Long Term Evolution (LTE, or aLTE) system. The UE may support the New Radio Access Technology Systems in addition to the legacy system such as LTE, and other advancements.

The User Equipment (UE) may in particular be an aerial UE. An aerial UE may for example be an UE that is provided in, on or at an aerial vehicle. An aerial device may for example be an Unmanned Aerial Vehicles (UAV) (a "Drone"), or aircrafts that operate with various degrees of autonomy, e.g. under remote control by a human operator or autonomously by an onboard micro controller. An aerial UE may be a mobile communications device that is configured to communicate data via the transmission and reception of signals representing data using a wireless access interface. In the context of this application, the term aerial UE is also used for an electronic device that is autonomously or semi-autonomously operating in an aerial device, without the operator (or "user") of the device being required to be located at or close to the device. The term User Equipment (UE) thus also relates to equipment where the user is located remote to the equipment.

Circuitry of an infrastructure equipment may include at least one of: a processor, a microprocessor, a dedicated circuit, a memory, a storage, a radio interface, a wireless interface, a network interface, or the like, e.g. typical electronic components which are included in a base station, such as an eNodeB.

System information (SI) may be broadcasted by an eNB over logical channel BCCH. This logical channel information may for example be further carried over transport channel BCH or carried by DL-SCH. System Information may be transmitted in the form of blocks (SIBs) that are grouped in SI containers. SIBs may for example be transmitted using BCCH mapped on DL-SCH which in turn mapped on PDSCH. System information may for example be changed every BCCH modification period.

Dedicated signalling may be any signalling that is designated for use exclusively by a specified UE. Dedicated signalling may for example be performed by RRC signalling. Dedicated signalling may use a dedicated channel The circuitry of the infrastructure equipment may for example be configured to deliver the assistance information received from the target base station to the UE within an RRC connection reconfiguration message. The RRC connection reconfiguration message is a command to modify an RRC connection. A purpose of the RRC connection reconfiguration message may for example be to establish/modify/release Radio Bearers, e.g. to perform handover (handover command).

Assistance information may be system information (SI) that is pushed by the network to specific UEs (network push). Assistance information may for example comprise positioning related information. For example, assistance information may comprise a positioning SIB, information identifying the location of neighbouring base stations, positioning information of a target base station, positioning configuration information, and/or positioning configuration assistance information.

Assistance information may for example be foreseen for use in RRC connection re-establishment, for example to select the cell to initiate the RRC connection re-establishment, or for use in cell selection/reselection after a RRC connection re-establishment failure which is indicated to the UE in the e.g. idleModeMobilityControlInfo IE in the RRC-ConnectionReestablishmentReject message. Assistance information may for example be foreseen for use in cell selection/reselection and may for example comprise information identifying the location of neighbouring base stations. For example, assistance information may include information identifying any base station in the vicinity of a base station that might act as a candidate for random access trials of an aerial UE after handover failure within the reception range of the system information. The information identifying the location of neighbouring base stations may for example comprise geographical coordinates, height and a cell ID of the respective base station. Still further the information identifying the location of neighbouring base stations may also comprise information identifying the location of the infrastructure equipment itself.

Assistance information for cell selection/reselection may also comprise information indicating whether or not a base station supports 3D beam forming. For example, assistance information for cell selection/reselection may comprise information identifying radio resources among uplink radio resources for which tilting of the main lobe is enabled.

Assistance information may be for example be pushed by the network to a UE in a system information block, e.g. in a system information block defined in the standard or the like.

The circuitry of the infrastructure equipment may further be configured to send assistance information to the target base station with a handover request message. A handover request message may for example be sent from a source base station to a destination base station during handover preparation.

The circuitry of the infrastructure equipment may further be configured to receive assistance information with a handover request message from a source base station. A handover request acknowledge message may for example be sent from a target base station to a source base station during handover preparation in response to a handover request message.

The circuitry of the infrastructure equipment may further be configured to determine, based on the assistance information received with the handover request message, if its own configuration is different from a configuration in the source base station.

The circuitry of the infrastructure equipment may further be configured to determine difference assistance information based on the assistance information received from the source base station and based on its own configuration.

The circuitry of the infrastructure equipment may further be configured to transmit the difference assistance information to the source base station.

The embodiments also disclose an electronic device comprising circuitry configured to receive assistance information with a handover command from a source base station. The electronic device may for example be a UE, in particular an aerial UE, i.e. an UE that is located in or at an aerial vehicle such as a drone or the like.

Circuitry of an electronic device (e.g. aerial UE) may include at least one of: a processor, a microprocessor, a dedicated circuit, a memory, a storage, a radio interface, a wireless interface, a network interface, or the like, e.g. typical electronic components which are included in a user equipment.

Assistance information received from the source base station may comprise a positioning SIB, information identifying the location of neighbouring base stations, positioning information of a target base station, and/or positioning configuration information, positioning configuration assistance information.

The circuitry of the electronic device may be configured to receive the assistance information within an RRC connection reconfiguration message.

The circuitry of the electronic device may be configured to use the assistance information for cell selection/reselection. Cell selection may relate to an access of an aerial UE or terrestrial UE to a mobile communications network after a handover failure.

The circuitry of the electronic device may be configured to use the assistance information after a handover failure. For example, in LTE, after handover failure, a UE performs certain steps before it can receive or transmit data. These steps can be categorized in cell search and cell selection, derivation of system information, and random access. After the access procedure, the terminal is able to receive and transmit its user data. Cell (re)selection may in particular be necessary after a handover failure.

The assistance information for cell selection/reselection may comprise information identifying the location of base stations, and the circuitry of the electronic device may be configured to determine a distance between the electronic device and each base station identified in the assistance information. The circuitry may further be configured to perform cell selection/reselection based on the distances between the electronic device (e.g. aerial UE) and the respective base stations.

The embodiments also describe a method comprising transmitting assistance information with a handover request acknowledge message from a target base station to a source base station. The method may further comprise providing, via the source base station, the assistance information to a UE, for example to an aerial UE. The method may further comprise transmitting assistance information from the source base station to the target base station with a handover request message. The assistance information transmitted from the target base station to the source base station may comprise difference assistance information. The method may further comprise determining difference assistance information based on the assistance information transmitted from the source base station to the target base station and based on a configuration in the target base station. Still further, the method may comprise and of the operational aspects describe above with regard to the infrastructure equipment and the electronic device.

The embodiments also describe a computer program causing a processor and/or circuitry to perform the methods described above, when being carried out on the computer and/or circuitry.

The embodiments also describe a non-transitory computer-readable recording medium storing a computer program product causing a processor and/or circuitry to perform the methods described above, when being carried out on a computer and/or circuitry.

Areal Cell Coverage

Cellular systems are designed by deploying eNBs so that each cell coverage for terrestrial UEs can be regarded as a unit for mobility management such as handover in connected mode or cell selection/reselection in idle mode. This cell coverage for terrestrial UEs can be treated as static coverage provided by transmission of cell specific reference signal (CRS) or Common Reference Signal.

Areal cell coverage for aerial UEs can be a static coverage similar to that for terrestrial UEs. However, from a perspective of minimization of interference to neighbouring cells and efficient usage of radio resources, areal cell coverage for aerial vehicles can be provided in a dynamic manner.

In the embodiments described below in more detail, the term "areal cell coverage" is used to refer to a second coverage ("aerial cell coverage") that is provided by an eNB to aerial UEs, in addition to a first coverage (or "terrestrial cell coverage") that is provided by the eNB to terrestrial UEs.

FIG. 1 discloses an embodiment in which an eNB 100 that is designed based on currently deployed base stations for cellular systems builds a different type of cell coverage ("aerial cell coverage") for aerial UEs in addition to the normal cell coverage ("terrestrial cell coverage") for terrestrial UEs. In FIG. 1, eNB 100 provides terrestrial UEs 102, 103 with a cell coverage 120 for terrestrial UEs and eNB 100 provides an aerial vehicle 104 comprising an aerial UE with a cell coverage 140 for aerial UEs. This "areal cell coverage" may adapt to the varying size of coverage provided by eNB 100 depending on the height 106 of flying aerial vehicle 104.

As the number of visible cells may depend on the height 106 of aerial vehicle 104, in connected mode, the transmission power from eNB 100 and/or from aerial vehicle 104 may be controlled depending on the height of aerial vehicle 104. For example, the transmission power from eNB 100 and/or from aerial vehicle 104 may be controlled in a way that the area of areal cell coverage provided by eNB 100 remains almost the same size regardless of the height 106 of aerial vehicle 104. Accordingly, the same deployment philosophy for mobility management may be applied regardless of height of aerial vehicle 104. This may allow eNBs to be geometrically deployed so that efficient mobility can be performed.

Most of the aerial UEs are equipped with a GNSS (Global Navigation Satellite System) like GPS or any other accurate positioning function. In order to allow for a dynamic control of the areal cell coverage provided by the eNB, an aerial vehicle 104 may report its altitude (height) to eNB 100. For example, aerial vehicle 104 can report a value of altitude measured via GPS (Global Positioning System) or a height measured via pressure sensor to eNB 100. The eNB may have a database storing a relation between areal cell coverage and the coordination of eNB position. For example, the site information database stores the cell ID, eNB coordination, cell radius, transmission power, antenna configuration, and so on. This information is originally for terrestrial cell coverage, but it could be useful for areal carrier. When an eNB receives the position of an aerial vehicle, the eNB calculates the cell coverage area according to the information in the database. Then, the eNB checks whether the aerial vehicle is within the calculated cell coverage area or not. Alternatively, the UE may receive a subset of that database in a neighbor area of its current position from the network in advance. For example, the site database may accommodate all eNBs information. It may be too large to store in the UE. The site database picks up the information of nearest eNB from the current aerial vehicle position and its neighbor eNBs of the nearest eNB, which is called here a "neighbor area". The eNB may send the selected eNBs information from the data base to aerial vehicle. The aerial vehicle may calculate the cell coverage of a nearest eNB and its neighbor eNBs as well. This may be the calculated cell coverage, also called "zone".

An eNB as described above may thus have the latest/accurate location of aerial UEs. eNBs regularly update the location information to MME or to a location server of aerial UEs. MME/location server may provide this information to an external server of air traffic control. Vice versa, the external server might send the information/direction from traffic control to aerial UE via MME.

DownLink Mobility

In downlink-based mobility, a UE may receive reference signals (e.g., measurement reference signals (MRS) from an eNB and report measurements to the eNB. The indication of the preferred beam and/or transmission point may be included in an uplink reference signal from the UE. Mobility decisions (e.g., for a handover command) at the BS can be based on measurement of the uplink reference signal and/or based on the indication in the uplink reference signal of the preferred beam and/or transmission point. The eNB can also use the indication of the preferred beam for beamforming downlink signals to the UE.

Figure 2:
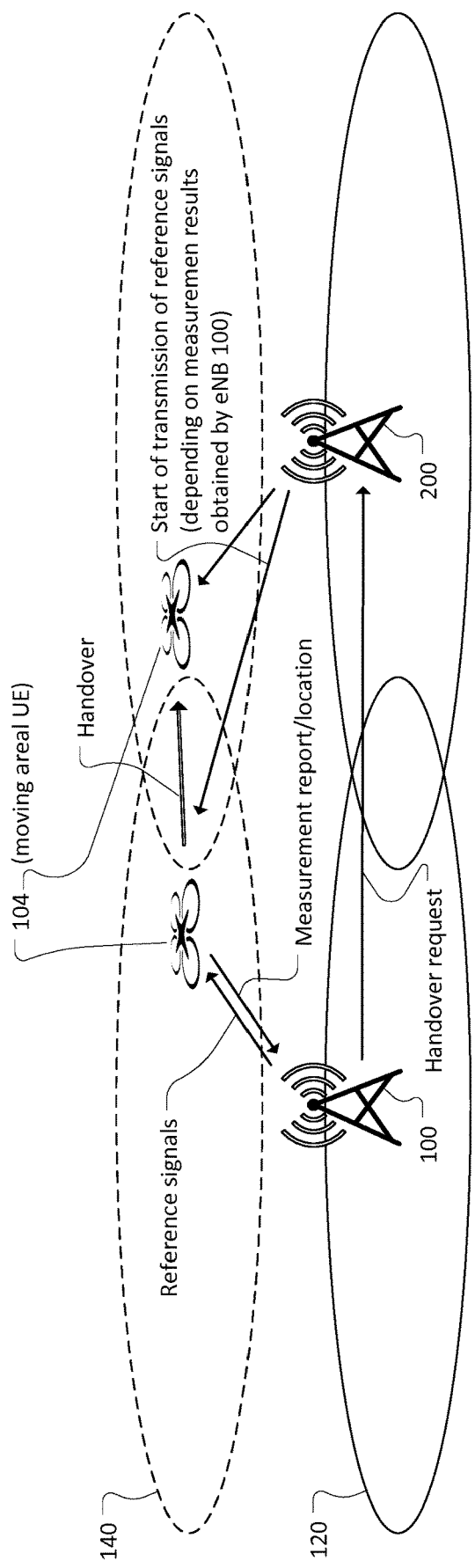
FIG. 2 shows an example of a handover procedure in a DL-based mobility case.

FIG. 2 shows an example of a handover procedure in a DL-based mobility case. A network can monitor a link quality/channel condition between the aerial UE 104 and the serving eNB 100 over "Virtual Cell coverage" by means of reporting measurement/location from the aerial UE 104 and instruct a neighbouring eNB 200 to start transmitting reference signals with beam-forming by multiple antennas depending on the link quality/channel condition. In accordance with this instruction of a neighbouring eNB 200 by the network, the serving eNB 100 can update the configuration of measurement reporting from the aerial UE 104 so as to include the measurements of neighbouring eNB 200 as well as the measurements of serving eNB 100. The serving eNB 100 will judge whether handover to one of neighbouring eNB 200 is necessary or not, based on measurements including measurements from neighbouring eNB 200 reported from aerial UE 104. In the case that the serving eNB 100 judges that handover is necessary, the serving eNB 100 will send a Handover Request to neighbouring eNB 200 as a target eNB and trigger handover procedure (e.g. X2 Based handover procedure). An exemplifying description of the Intra-MME/Serving Gateway Handover in LTE which provides more details about the handover procedure is provided with regard to FIG. 10 below.

Figure 3:
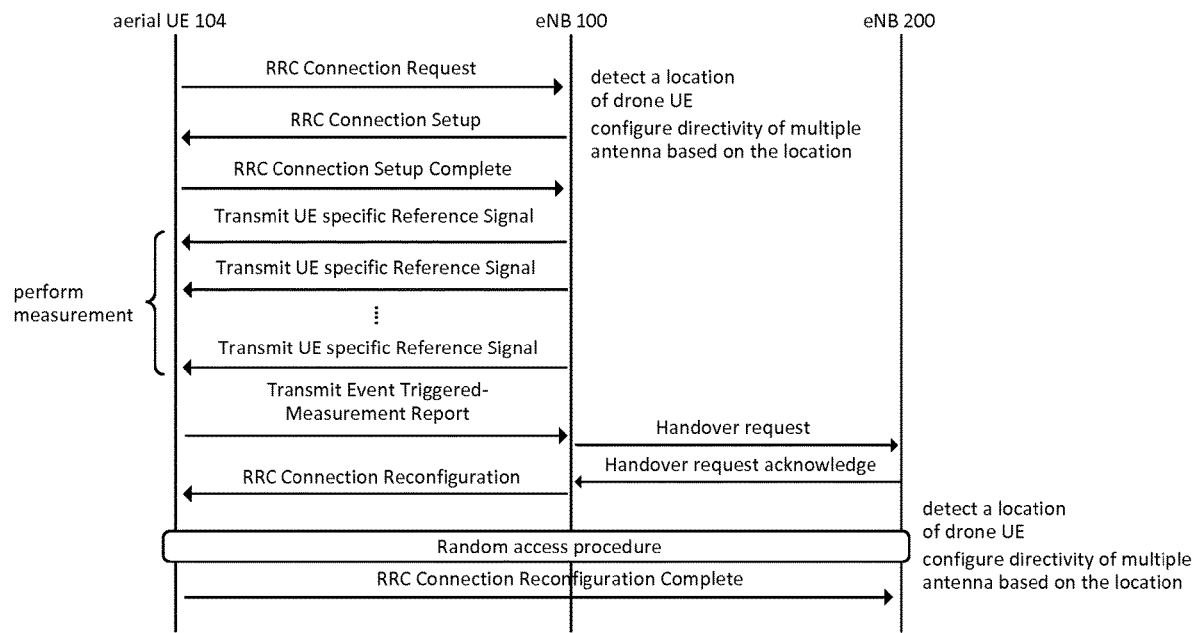
FIG. 3 describes an embodiment of message flow in a DL (DownLink) mobility case.

FIG. 3 describes an embodiment of message flow in a DL (DownLink) mobility case. According to this embodiment, an aerial UE 104 sends an RRC Connection Request to eNB 100. This RRC Connection Request triggers eNB 100 to send RRC Connection Setup and to start transmitting some reference signals using limited resource blocks (RBs) formed by beam-forming technology such as FD MIMO (Full Dimension MIMO) or the like, taking into account efficient radio resource usage.

In FIG. 3 the eNB which transmits the RRC Connection Setup and the reference signals is identical to the eNB which received the RRC Connection Request from aerial UE 104. However, the RRC Connection Request from the aerial vehicle 104 may not always be received by a nearest eNB (as referred to in R2-1705427). Accordingly, the network may manage the nearest eNB as a serving cell. For this purpose the RRC Connection Setup from aerial UE 104 can include location information including height or altitude of aerial UE 104.

The (serving) eNB can transmit the reference signals with beam-forming by multiple antennas to the extent that aerial vehicles with mobility can receive the reference signals and periodicity of transmitting these reference signals may be depend on the mobility (e.g. a speed) of the respective aerial vehicle.

As indicated by the bracket in FIG. 3, eNB 100 periodically performs measurements in order to track aerial UE 104, detects mobility (e.g. a location) of aerial UE 104, and adapts the transmission of reference signals to the mobility (e.g. location) of aerial UE 104, e.g. by configuring the directivity of multiple antenna based on the location of aerial UE 104. In order to visualize this, in FIG. 3, there are depicted multiple instances of transmission of reference signals, where each transmission represents a transmission with changed mobility (e.g. position and/or speed) of aerial UE 104.

The reference signals transmitted by eNB 100 may be UE specific and on demand manner. That is, other than with static cell coverage for terrestrial UEs, here, the eNB 100 sends the reference signals for aerial UE 104 on demand and thus does not need to always transmit the reference signals.

Furthermore, eNB 100 can provide aerial UE 104 with any system information in response to the RRC Connection Request from aerial UE 104. Here, the system information for aerial UE 104 may be distinguished from those for terrestrial UEs. The aerial UE 104 might be in connected mode upon reception of the reference signals formed by beam-forming by multiple antennas, because a feedback of measurement or reporting of location could be necessary for configuring that beam-forming to the same extent.

Possibly eDRX (enhanced DRX) can be applied to the aerial vehicles 104 in connected mode for the purpose of reducing power consumption. Furthermore, inactive duration of this eDRX can be configured according to the mobility of the aerial vehicles 104, such as a speed.

The aerial UE 104 performs event triggered reporting of measurements from the aerial UE 104 to serving eNB 100. A measurement report may also comprise information concerning the location of aerial UE 104. Based on the measurement report/location obtained from the aerial UE, the network can monitor a link quality/channel condition between the aerial UE 104 and the serving eNB 100 and start Handover preparation, if appropriate. During Handover preparation, the network may instruct a neighbouring eNB 200 to start transmitting reference signals with beam-forming by multiple antennas. During Handover preparation, in accordance with this instruction of a neighbouring eNB 200 by the network, the serving eNB 100 can update the configuration of measurement reporting from the aerial UE 104 so as to include the measurements of neighbouring eNB 200 as well as the measurements of serving eNB 100. In the case that the serving eNB 100 (or the network) judges that handover is necessary, the serving eNB 100 will send a Handover Request to neighbouring eNB 200 as a target eNB and trigger handover procedure. As described below in more detail with regard to FIG. 4, besides the conventional MIB/SIB1/SIB2 system information, additional information is included in this handover request. When the neighbouring eNB 200 has acknowledged the handover request, the source eNB 100 will send the handover command (RRC Connection Reconfiguration with MobilityControlInfo) to the aerial UE, which results in that the aerial UE starts the Random Access Procedure with eNB 200, and if reconfiguration is successful, in that aerial UE 104 issues a RRC Connection Reconfiguration Complete to eNB 200.

Network Behavior During Handover Preparation

The embodiments described below in more detail focus on UEs in RRC CONNECTED state, especially on aerial UEs (UAVs) in handover. According to the embodiments, assistance information comprising positioning related information, e.g. a positioning SIB and positioning information of a target base station (cell) is provided in the handover request acknowledgement from a target eNB to a source eNB during handover preparation. This information is then delivered via the source eNB to aerial UEs in the handover procedure. The aerial UEs may utilize this assistance information in the case of handover failure (HOF). Other than system information that is periodically broadcast to UEs and on-demand system information, the assistance information is pushed by the network to aerial UEs during handover procedure. The RRC connection re-establishment procedure after handover failure can thus be accelerated and the cell selection can, among others, be based on the assistance information pushed by the network. The embodiments thus address how to provide assistance information in advance which can be utilized when the handover failure happens in order to quickly get recovered from handover failure, if any.

As shown in FIG. 3, once the source base station receives the measurement reports from UAV and makes a handover decision, the source base station will send a handover request to the target base station.

In the following it is provided an example in which the source and target eNBs support different positioning schemes. According to this example, the source eNB supports an RTK (Real Time Kinematic) positioning scheme, whereas the target eNB, in addition to RTK, supports barometer information. As described in 3GPP R2-1708646, "Discussion on State Space RTK Corrections", TSG RAN WG2 Meeting #99, Berlin, Germany, 21-25 Aug. 2017, RTK (Real time Kinematic) describes GNSS receivers that are able to fix carrier phase ambiguities within a short time (10-30 seconds) and thus can achieve cm-level accurate positioning results.

FIG. 4a shows an embodiment of a handover request message. The handover request message HANDOVER_REQUEST is sent by the source eNB to the target eNB to request the preparation of resources for a handover. Besides the conventional MIB/SIB1/SIB2 system information, assistance information AssistanceInfo is included in the HANDOVER_REQUEST message. This AssistanceInfo may for example be included in a SIB provided by the source base station. This SIB may for example be defined in the standard to include the AssistanceInfo.

FIG. 4b shows an embodiment of positioning information that may be included in a HANDOVER_REQUEST message. Here, the assistance information AssistanceInfo comprises information elements that tell the target eNB what the current positioning related configuration in the source eNB is. According to this example, the AssistanceInfo comprises a PositioningConfiguration information element 403 that indicates to the target eNB what positioning scheme the source eNB is using. Here, the PositioningConfiguration information element comprises an information element RTK_GNNS that indicates that the source eNB uses RTK GNSS as positioning scheme. Still further, the AssistanceInfo information comprises assistance information PositioningConfigurationAssistanceInfo. PositioningConfigurationAssistanceInfo comprises information that is used by the positioning scheme of the source eNB to allow aerial eNBs to accurately determine their position. As the target eNB supports an RTK positioning scheme, the positioning configuration assistance information 603 comprises RTK correction data. As described in Table 1 of R2-1708646, RTK correction data broadcast to RTK GNSS receivers as defined by QZSS uses SSR (State Space Representation) as the primary correction format. The correction data that is broadcast as assistance positioning information comprises Compact SSR Mask, Compact SSR GNSS Orbit Correction, Compact SSR GNSS Clock Correction, Compact SSR GNSS Satellite Code Bias, Compact SSR GNSS Satellite Phase Bias, Compact SSR GNSS Satellite Code and Phase Bias, Compact SSR GNSS URA, Compact SSR STEC Correction, Compact SSR STEC Correction, and Compact SSR Gridded Correction.

Figure 5:
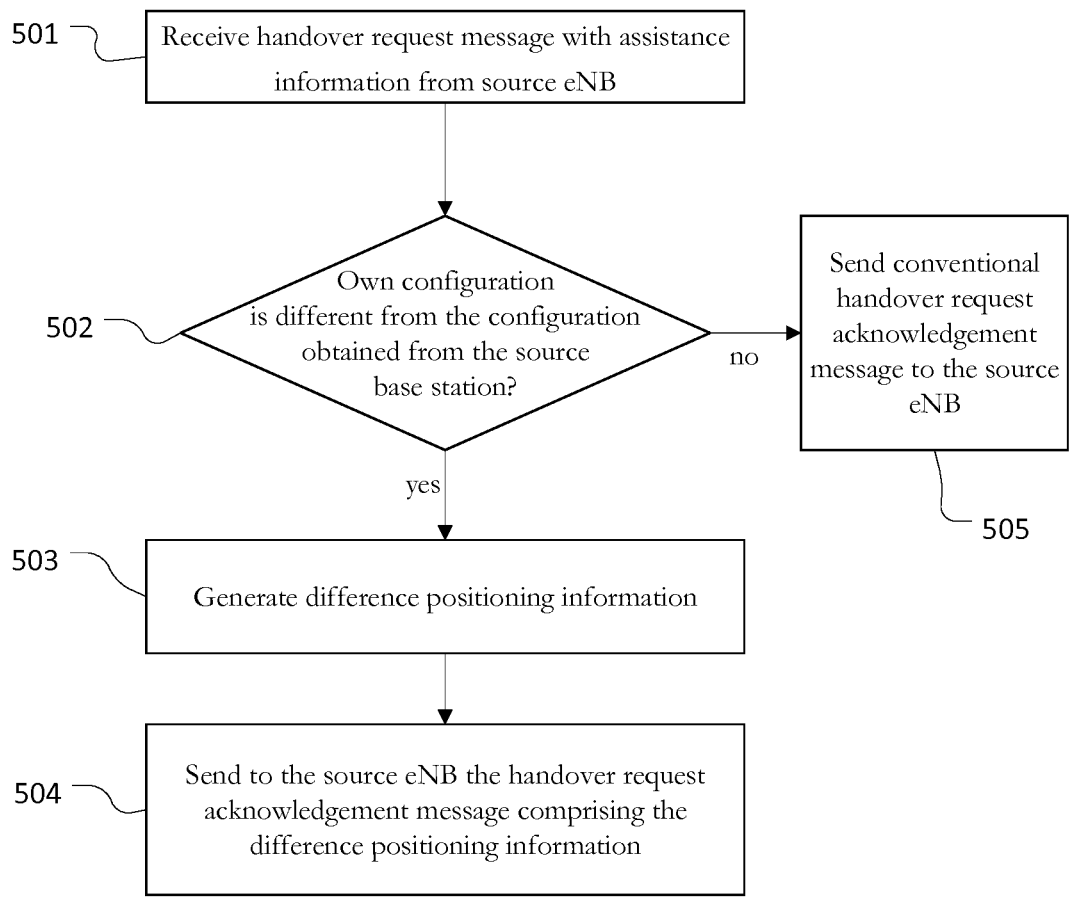
FIG. 5 shows a process at the target eNB during handover preparation.

FIG. 5 shows a process at the target eNB. At 501, the target eNB receives the handover request message with additional information. After receiving this additional information, at 502, the target eNB checks whether it has different configurations than the source base station. If it is decided at 502 that the configuration of the target eNB is different from the configuration obtained from the source eNB, then, at 503, the target eNB generates Delta positioning SIBs of the target base station and, at 504, the target eNB sends the handover request acknowledgement message (see FIG. 3) to the source eNB, the handover request acknowledgement message comprising Delta positioning SIBs of the target base station.

FIG. 6a shows an embodiment of a handover request acknowledgement message as sent from the target eNB to the source eNB. The handover request acknowledgement message 600 comprises positioning information of the target eNB. According to this embodiment, this positioning information of the target eNB is sent as difference data ("as a Delta") with respect to the positioning information obtained from the source eNB in the handover request message as described with regard to FIG. 4 above. This AssistanceInfo may for example be included in a SIB or in a separate IE (Information Element) provided by the target base station. This SIB may for example be defined in the standard to include this AssistanceInfo.

FIG. 6b shows an embodiment of assistance information included in a handover request acknowledgement message. The assistance information comprises positioning configuration information PositioningConfiguration that is provided to tell what the current positioning related configuration in the target eNB is. Here, PositioningConfiguration includes an information element RTK_GNSS that indicates to the source eNB that the target eNB uses RTK GNSS as a positioning scheme. Still further PositioningConfiguration comprises an information element Barometric that indicates to the source eNB that the target eNB, in addition to the RTK GNSS positioning scheme, provides barometric information.

As the target eNB has determined (see 502 in FIG. 5) that both source eNB and target eNB use RTK GNSS as a positioning scheme, the target eNB does not provide any RTK correction data to the source eNB. This is not necessary, because the target eNB determines that its RTK correction data is the same as the RTK correction data received from the source eNB in the handover request. However, the target eNB has determined (in 502 of FIG. 5) that it uses Barometric information in addition to the RTK GNSS positioning scheme that is used by the source eNB. Accordingly, the target eNB includes assistance information Positioning-ConfigurationAssistanceInfo into the positioning information that provides assistance information the source eNB that is related to Barometric.

FIG. 6c shows an example of positioning configuration assistance information that is sent from the target eNB to the source eNB. As the target eNB supports barometric information in addition to the RTK positioning scheme used by the source eNB and the target eNB, the PositioningConfigurationAssistanceInfo comprises BarometricInfo.

The BarometricInfo comprises an information element ReferenceLocationInfo which comprises the information elements ID number (of type index number), longitude (of type degree), latitude (of type degree), and coordinate system (a selection e.g. WGS84), and elevation (in meters from sea level). Still further, BarometricInfo comprises an information element MeasuredValues which comprises the information elements temperature (in degree Celsius), and barometer value (in hPa). Still further, BarometricInfo comprises an information element ValidityInfo which comprises the information elements Measured timestamp (time/date), expired time/date (time/date or timer value), next planned update time (time/date), and validity area/cell radius (in meters, from the centre of cell).

By including this information in a SIB and providing this SIB in the handover request acknowledgement message from the target eNB to source eNB, the source eNB may deliver all the information to the aerial UE in its RRC connection reconfiguration message with mobility control information (see FIG. 3 and corresponding explanations). The information may be transparent to the source eNB, i.e. it may be included in a transparent container from target eNB to source eNB. The source eNB delivers the RRC connection reconfiguration message prepared by the target eNB which is included in the handover request acknowledgement to the UE. An aerial UE that is equipped with a barometer can thus use this new positioning scheme of the target eNB (here the barometric scheme) in addition to the positioning scheme that is used in common by the source eNB and the target eNB (here RTK GNSS).

FIG. 6d shows a further example of positioning configuration assistance information that is sent from the target eNB to the source eNB. According to this example, it is assumed that both source and target base station use RTK GNSS, but that the respective assistance information has a respective validity area and validity time. If the target base station finds that one message has been updated/changed in its own RTK positioning SIB, e.g. message Compact SSR GNSS Clock Correction, it will include the updated parameter Compact SSR GNSS Clock Correction in the message from the target eNB to source eNB. Then an aerial UE can use this new parameter Compact SSR GNSS Clock Correction together with previously stored RTK information provided in the source eNB.

Figure 7:
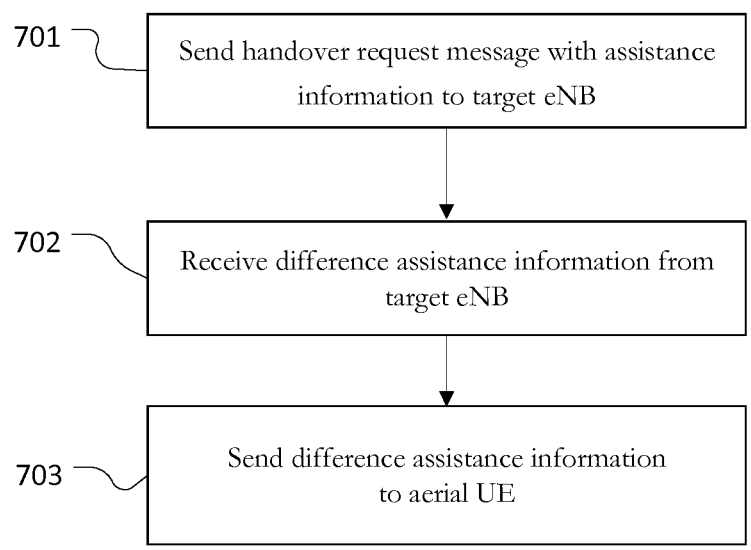
FIG. 7 shows a process at the source eNB during handover preparation and execution.

FIG. 7 shows a process at the source eNB. At 701, the source eNB sends a handover request message with assistance information to a target eNB. At 702, the source eNB receives difference assistance information from the target eNB. At 703, the source eNB sends the difference assistance information obtained from the target eNB to an aerial UE.

Behavior of Aerial UE During Handover

Figure 8:
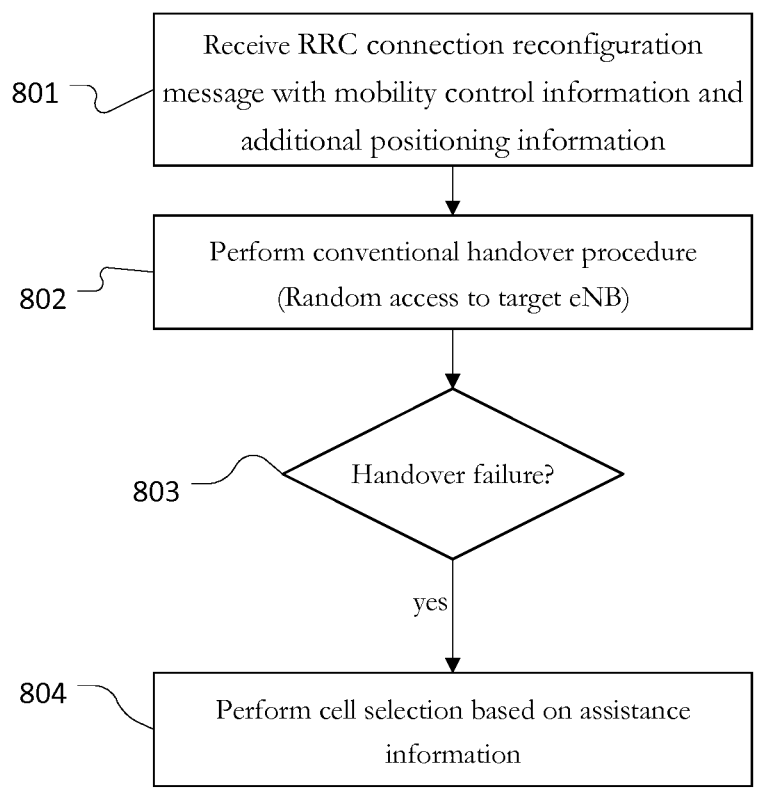
FIG. 8 shows an embodiment of the behavior of an aerial UE during handover.

FIG. 8 shows an embodiment of the behavior of an aerial UE during handover. At 801, the aerial UE receives the RRC connection reconfiguration message with mobility control information and additional positioning information. After receiving this handover command, at 802, the aerial UE performs the conventional handover procedure (random access to target eNB). At 803, the aerial UE determines if the conventional handover procedure was successful. If it is determined at 803 that a handover failure happens, the aerial UE, at 804, uses the additional information to perform an RRC connection re-establishment procedure.

With this assistance information provided in the handover command, the aerial UE does not need to acquire the system information from the target UE in advance (assuming the aerial UE is already in the coverage of the target eNB and those configurations are different in source and target eNBs). The aerial UE may select a cell, if necessary, i.e. it can perform a positioning based selection in order to initiate RRC connection re-establishment after a handover failure. The RRC connection re-establishment can be accelerated as a result. Furthermore, should the RRC connection re-establishment procedure fail, the UE can still make use of this assistance information or acquire it from RRCConnectionReestablishmentReject message which is sent from the cell to which UE sent RRCConnectionReestablishment Request, if any, to make the cell selection/reselection i.e. positioning based cell selection/reselection after UE goes to RRC_IDLE state.

Implementation

Figure 9:
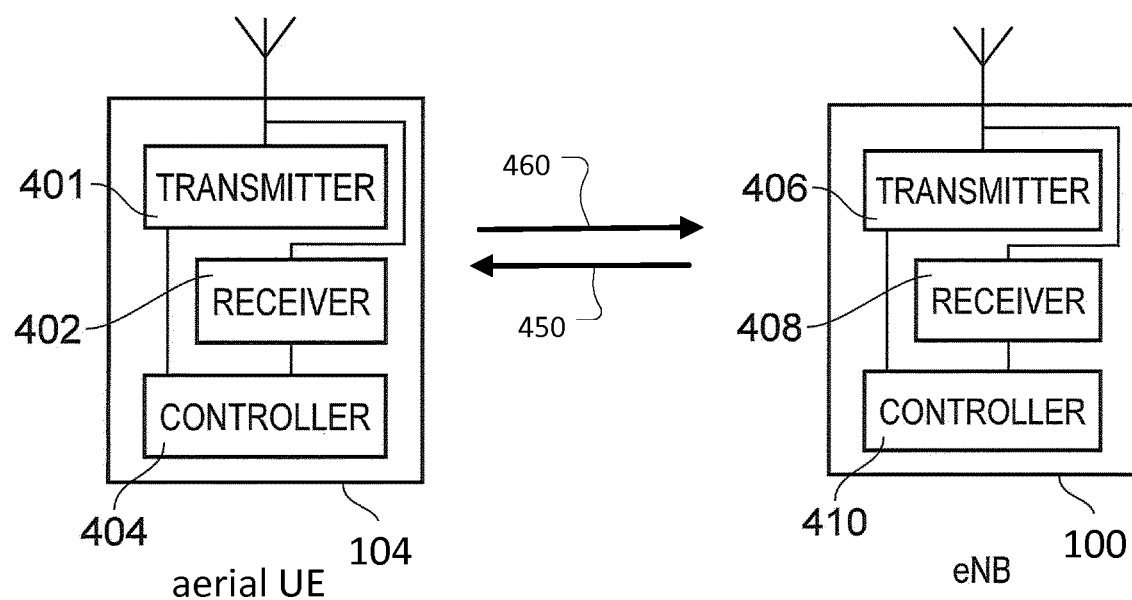
FIG. 9 shows a schematic block diagram of a communications path between an aerial UE and an eNB.

FIG. 9 shows a schematic block diagram of a communications path between an aerial UE 104 and an eNB 102. As shown in FIG. 8 the aerial UE 104 includes a transmitter 401 a receiver 402 and a controller 404 to control the transmission of signals to the eNB 100 and the reception. The up-link signals are represented by an arrow 460 which corresponds to that shown in FIG. 1 of signals from eNB 100. Downlink signals are shown by an arrow 450. The eNB 100 includes a transmitter 404 a receiver 408 and a controller 410 which may include a scheduler for scheduling the transmission and reception of signals on the downlink and the uplink in accordance with a wireless access interface.

Figure 10:
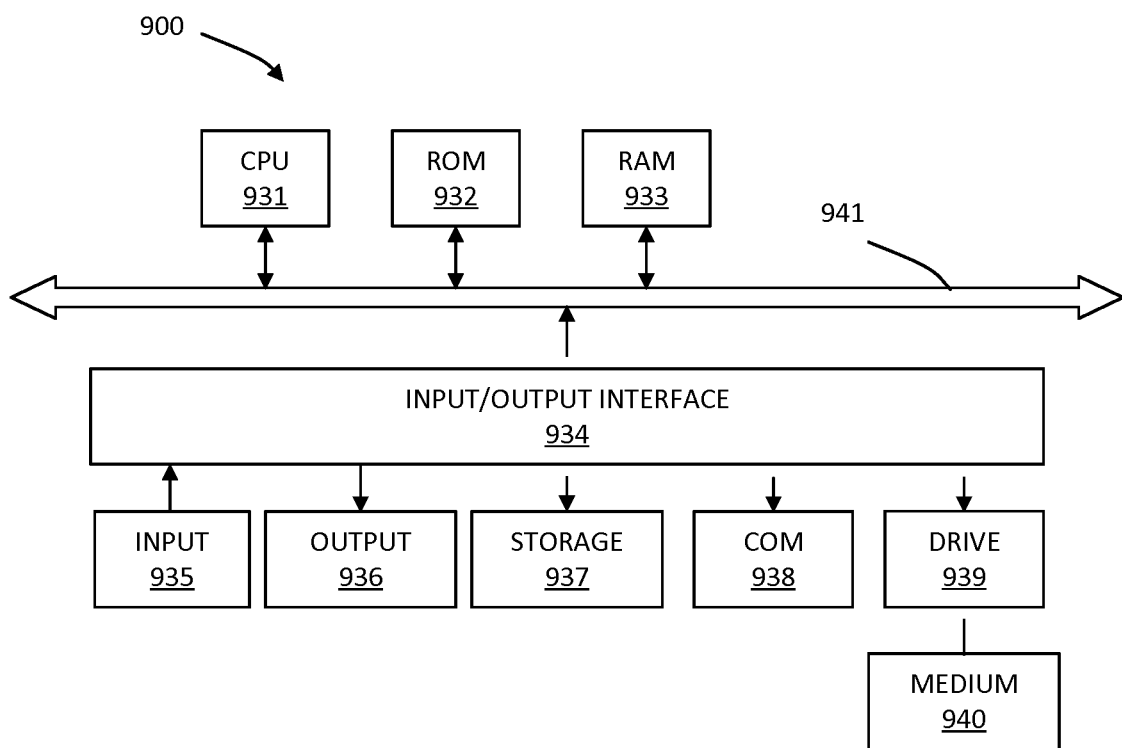
FIG. 10 shows an embodiment of a controller for a UE or for an eNB.

An embodiment of a controller 900 is described under reference of FIG. 10. This controller 900 can be implemented such that it can basically function as any type of apparatus or entity, base station or new radio base station, transmission and reception point, or user equipment as described herein. Controller 900 can thus act as controller 404 of FIG. 9 or as controller 410 of FIG. 9. The controller 900 has components 931 to 940, which can form a circuitry, such as any one of the circuitries of the entities, base stations, and user equipment, as described herein.

Embodiments which use software, firmware, programs or the like for performing the methods as described herein can be installed on controller 900, which is then configured to be suitable for the concrete embodiment.

The controller 900 has a CPU 931 (Central Processing Unit), which can execute various types of procedures and methods as described herein, for example, in accordance with programs stored in a read-only memory (ROM) 932, stored in a storage 937 and loaded into a random access memory (RAM) 933, stored on a medium 940, which can be inserted in a respective drive 939, etc.

The CPU 931, the ROM 932 and the RAM 933 are connected with a bus 941, which in turn is connected to an input/output interface 934. The number of CPUs, memories and storages is only exemplary, and the skilled person will appreciate that the controller 900 can be adapted and configured accordingly for meeting specific requirements which arise when it functions as a base station, and user equipment.

At the input/output interface 934, several components are connected: an input 935, an output 936, the storage 937, a communication interface 938 and the drive 939, into which a medium 940 (compact disc, digital video disc, compact flash memory, or the like) can be inserted.

The input 935 can be a pointer device (mouse, graphic table, or the like), a keyboard, a microphone, a camera, a touchscreen, etc. The output 936 can have a display (liquid crystal display, cathode ray tube display, light emittance diode display, etc.), loudspeakers, etc. The storage 937 can have a hard disk, a solid state drive and the like.

The communication interface 938 can be adapted to communicate, for example, via a local area network (LAN), wireless local area network (WLAN), mobile telecommunications system (GSM, UMTS, LTE, etc.), Bluetooth, infrared, etc. When the controller 900 functions as a base station, the communication interface 938 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the controller 900 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

It should also be noted that the division of the control or circuitry of FIG. 10 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) An infrastructure equipment comprising circuitry configured to receive assistance information with a handover request acknowledge message from a target base station, and to deliver the assistance information received from the target base station to an UE with dedicated signalling.

(2) The infrastructure equipment of (1), wherein the circuitry is configured to deliver the assistance information received from the target base station to the UE within an RRC connection reconfiguration message.

(3) The infrastructure equipment of (1) or (2), wherein the assistance information comprises positioning related information.

(4) The infrastructure equipment of anyone of (1) to (3), wherein the assistance information comprises a positioning SIB, information identifying the location of neighbouring base stations, positioning information of a target base station, and/or positioning configuration information, positioning configuration assistance information.

(5) The infrastructure equipment of anyone of (1) to (4), wherein the circuitry is further configured to send assistance information to the target base station with a handover request message.

(6) An infrastructure equipment comprising circuitry configured to receive assistance information with a handover request message from a source base station.

(7) The infrastructure equipment of (6), wherein the circuitry is configured determine, based on the assistance information received with the handover request message, if its own configuration is different from a configuration in the source base station.

(8) The infrastructure equipment of (6) or (7), wherein the circuitry is configured to determine difference assistance information based on the assistance information received from the source base station and based on its own configuration.

(9) The infrastructure equipment of anyone of (6) to (8), wherein the circuitry is configured to transmit the difference assistance information to the source base station.

(10) An electronic device comprising circuitry configured to receive assistance information with a handover command from a source base station.

(11) The electronic device of (10), wherein the assistance information received from the source base station comprises a positioning SIB, information identifying the location of neighbouring base stations, positioning information of a target base station, and/or positioning configuration information, positioning configuration assistance information.

(12) The electronic device of (10) or (11), wherein the circuitry is configured to receive the assistance information within an RRC connection reconfiguration message.

(13) The electronic device of anyone of (10) to (12), wherein the circuitry is configured to use the assistance information for connection re-establishment and/or cell selection/reselection.

(14) The electronic device of anyone of (10) to (13), wherein the circuitry is configured to use the assistance information after a handover failure.

(15) A method comprising transmitting assistance information with a handover request acknowledge message from a target base station to a source base station.

(16) The method of (15), further comprising providing, via the source base station, the assistance information to a UE.

(17) The method of (16), wherein the UE is an aerial UE.

(18) The method of anyone of (15) to (17), further comprising transmitting assistance information from the source base station to the target base station with a handover request message.

(19) The method of anyone of (18), further comprising determining difference assistance information based on the assistance information transmitted from the source base station to the target base station and based on a configuration in the target base station.

(20) The method of anyone of (15) to (18), wherein the assistance information transmitted from the target base station to the source base station comprises difference assistance information.

(21) A computer program causing a processor and/or a circuitry to perform the methods of anyone of (15) to (20), when being carried out on the processor and/or circuitry.

(22) A non-transitory computer-readable recording medium storing a computer program product causing a processor and/or a circuitry to perform the methods of anyone of (15) to (20), when being carried out on a processor and/or circuitry.

The invention claimed is:

1. An infrastructure equipment configured to act as a source base station in a wireless communication network that includes the source base station, a target base station, and an aerial user equipment (UE), the infrastructure equipment comprising circuitry configured to:
send a handover request message to the target base station, the handover request message including initial assistance information that informs the target base station about a first positioning related configuration used between the source base station and the aerial UE for three dimensional positioning of the aerial UE,
receive a handover request acknowledge message from a target base station, the handover request acknowledge message including difference assistance information that identifies a second positioning related configuration, different from the first positioning related configuration, available for use between the target base station and the aerial UE for three dimensional positioning of the aerial UE, and
deliver the difference assistance information to the aerial UE with dedicated signalling.

2. The infrastructure equipment of claim 1, wherein the circuitry is configured to deliver the difference assistance information received from the target base station to the UE within an radio resource control (RRC) connection reconfiguration message.

3. The infrastructure equipment of claim 1, wherein the initial assistance information and the difference assistance information each comprises respective ones of a positioning system information block (SIB), information identifying a location of one or more neighbouring base stations, or positioning information of another target base station.

4. An infrastructure equipment configured to act as a target base station in a wireless communication network that includes a source base station, the target base station, and an aerial user equipment (UE), the infrastructure equipment comprising circuitry configured to:
receive a handover request message from the source base station, the handover request message including initial assistance information that informs the target base station about a first positioning related configuration used between the source base station and the aerial UE for three dimensional positioning of the aerial UE,
transmit a handover request acknowledge message to the source base station, the handover request acknowledge message including difference assistance information that identifies a second positioning related configuration, different from the first positioning related configuration, available for use between the target base station and the aerial UE for three dimensional positioning of the aerial UE, and
perform a handover of the aerial UE from the source base station based on at least one of the first positioning related configuration or the second positioning related configuration.

5. An electronic device configured to act as an aerial user equipment (UE) in a wireless communication network that includes a source base station, a target base station, and the aerial UE, the electronic device comprising circuitry configured to:
receive a handover command message from the source base station, the aerial UE in communication with the source base station in accordance with a first positioning related configuration, for three dimensional positioning of the aerial UE, provided by the source base station to the aerial UE as part of initial assistance information,
wherein the handover command message includes difference assistance information that identifies a second positioning related configuration, different from the first positioning related configuration, available for use between the target base station and the aerial UE for three dimensional positioning of the aerial UE, and
perform a handover from the source base station to the target base station based on at least one of the first positioning related configuration or the second positioning related configuration.

6. The electronic device of claim 5, wherein the initial assistance information and the difference assistance information each comprises respective ones of a positioning system information block (SIB), information identifying a location of one or more neighbouring base stations, or positioning information of another target base station.

7. The electronic device of claim 5, wherein the handover command message is a radio resource control (RRC) connection reconfiguration message.

8. The electronic device of claim 5, wherein the circuitry is configured to use the second positioning related configuration for connection re-establishment and/or cell selection/reselection.

9. The electronic device of claim 5, wherein the circuitry is configured to use the second positioning related configuration for the handover to the target base station after a failure of the handover that is based on the first positioning related configuration.

* * * * *